(12) United States Patent
Negri Jimenez et al.

(10) Patent No.: US 11,958,240 B2
(45) Date of Patent: Apr. 16, 2024

(54) THREE-DIMENSIONAL PRINTING WITH ORGANOSILANES

(71) Applicant: Hewlett-Packard Development Company, L.P., Spring, TX (US)

(72) Inventors: Graciela Emma Negri Jimenez, San Diego, CA (US); Emre Hiro Discekici, San Diego, CA (US); Shannon Rueben Woodruff, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 117 days.

(21) Appl. No.: 17/298,811

(22) PCT Filed: Aug. 8, 2019

(86) PCT No.: PCT/US2019/045622
§ 371 (c)(1),
(2) Date: Jun. 1, 2021

(87) PCT Pub. No.: WO2021/025696
PCT Pub. Date: Feb. 11, 2021

(65) Prior Publication Data
US 2022/0363923 A1 Nov. 17, 2022

(51) Int. Cl.
*C09D 11/101* (2014.01)
*B29C 64/165* (2017.01)
(Continued)

(52) U.S. Cl.
CPC .......... *B29C 64/188* (2017.08); *B29C 64/165* (2017.08); *B33Y 10/00* (2014.12);
(Continued)

(58) Field of Classification Search
CPC ......... B33Y 70/00; B33Y 40/20; B33Y 10/00; C09D 11/101; C09D 11/324;
(Continued)

(56) References Cited

U.S. PATENT DOCUMENTS

| 5,798,144 A | 8/1998 | Varanasi et al. |
| 7,032,514 B2 | 4/2006 | Mori et al. |

(Continued)

FOREIGN PATENT DOCUMENTS

| CN | 106182770 A | 12/2016 |
| KR | 20180108185 | 10/2018 |

(Continued)

OTHER PUBLICATIONS

A Study on the Rheological and Mechanical Properties of Photo-Curable Ceramic/Polymer Composites with Different Silane Coupling Agents for SLA 3D Printing Technology.
(Continued)

*Primary Examiner* — Monica A Huson
(74) *Attorney, Agent, or Firm* — HP Inc. Patent Department

(57) ABSTRACT

A multi-fluid kit for three-dimensional printing can include a fusing agent and a detailing agent. The fusing agent can include water and a radiation absorber. The radiation absorber absorbs radiation energy and converts the radiation energy to heat. The detailing agent includes a lipophilic phase discontinuously dispersed within an aqueous phase by a surfactant. The lipophilic phase includes an organosilane having a central silicon atom coupled to a C6 to C24 aliphatic or alicyclic hydrocarbon and multiple hydrolyzable groups. The organosilane is present in the detailing agent at from about 1 wt % to about 20 wt %.

15 Claims, 5 Drawing Sheets

(51) Int. Cl.
*B29C 64/188* (2017.01)
*B33Y 10/00* (2015.01)
*B33Y 70/00* (2020.01)
*C09D 7/61* (2018.01)
*C09D 7/63* (2018.01)
*C09D 11/033* (2014.01)
*C09D 11/102* (2014.01)
*C09D 11/322* (2014.01)
*C09D 11/324* (2014.01)
*C09D 11/328* (2014.01)
*B29K 83/00* (2006.01)

(52) U.S. Cl.
CPC ............... *B33Y 70/00* (2014.12); *C09D 7/61* (2018.01); *C09D 7/63* (2018.01); *C09D 11/033* (2013.01); *C09D 11/101* (2013.01); *C09D 11/102* (2013.01); *C09D 11/322* (2013.01); *C09D 11/324* (2013.01); *C09D 11/328* (2013.01); *B29K 2083/00* (2013.01); *B29K 2995/0093* (2013.01)

(58) Field of Classification Search
CPC ...... C09D 11/322; C09D 7/63; C09D 11/033; C09D 11/328; C09D 7/61; C09D 11/102; C08L 83/04; B29C 64/188; B29C 64/165; B29C 64/30; B29K 2995/0093; B29K 2083/00; C08G 77/18
See application file for complete search history.

(56) References Cited

U.S. PATENT DOCUMENTS

| | | |
|---|---|---|
| 7,550,518 B2 | 6/2009 | Bredt et al. |
| 9,217,069 B2 | 12/2015 | Wan et al. |
| 10,322,544 B1 | 6/2019 | Simpson |
| 2006/0009549 A1 | 1/2006 | Legters et al. |
| 2009/0148813 A1 | 6/2009 | Sun et al. |
| 2019/0047216 A1 | 2/2019 | Emamjomeh et al. |
| 2019/0100626 A1 | 4/2019 | Durban et al. |
| 2022/0112393 A1 | 4/2022 | Negri et al. |

FOREIGN PATENT DOCUMENTS

| | | | |
|---|---|---|---|
| WO | 2016/134972 A1 | 9/2016 | |
| WO | WO-2016171724 | 10/2016 | |
| WO | 2018/095837 A1 | 5/2018 | |
| WO | WO-2019053258 | 3/2019 | |
| WO | 2019/108201 A1 | 6/2019 | |
| WO | 2019/108288 A1 | 6/2019 | |
| WO | WO 2019/108288 * | 6/2019 | ........... B29C 64/124 |

OTHER PUBLICATIONS

Lv Juan et al., 3D printing of a mechanically durable superhydrophobic . . . , May 15, 2017, Journal of Materials Chemistry A.

* cited by examiner

THREE-DIMENSIONAL PRINTING WITH ORGANOSILANES

BACKGROUND

Methods of three-dimensional (3D) digital printing, a type of additive manufacturing, have continued to be developed over the last few decades. However, systems for 3D printing have historically been expensive, though those expenses have been coming down to more affordable levels recently. In general, 3D printing technology can shorten the product development cycle by allowing rapid creation of prototype models for reviewing and testing, and/or can be used for product manufacturing in some instances. There are several commercial sectors, such as aviation and the medical industry, for example, that have benefitted from the ability to rapidly prototype and customize parts, and the industries taking advantage of this technology continue to grow.

DETAILED DESCRIPTION

Figure 1:
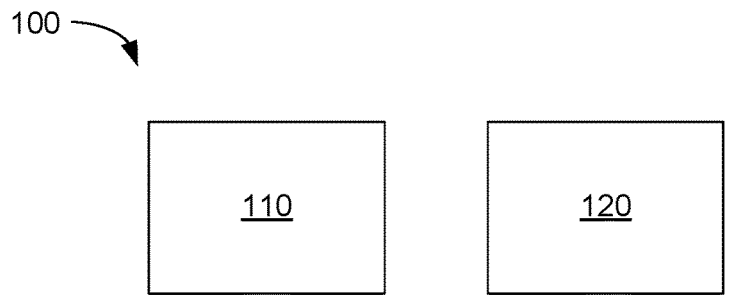
FIG. 1 is a schematic view of an example multi-fluid kit for three-dimensional printing in accordance with examples of the present disclosure.

The present disclosure relates multi-fluid kits for three-dimensional printing, three-dimensional printing kits, and methods of making three-dimensional printed articles. In one example a multi-fluid kit for three-dimensional printing can include a fusing agent and a detailing agent. The fusing agent can include water and a radiation absorber that absorbs radiation energy and converts the radiation energy to heat. The detailing agent can include a lipophilic phase discontinuously emulsified within an aqueous phase by a surfactant, wherein the lipophilic phase includes an organosilane having a central silicon atom coupled to a C6 to C24 hydrocarbon and multiple hydrolyzable groups, wherein the organosilane is present in the detailing agent at from about 1 wt % to about 20 wt %. In one example, the organosilane can be a trialkoxyorganosilane compound including a C6 to C14 hydrocarbon. In another example, the organosilane can be present in the detailing agent at from about 2 wt % to about 10 wt %. The organosilane and the surfactant, for example, can be present in the detailing agent at a weight ratio from about 4:1 to about 1:1. In further detail, the C6 to C24 hydrocarbon is directly coupled to a heteroatom selected from oxygen, nitrogen, sulfur, or a combination thereof. The radiation absorber can include a metal dithiolene complex, carbon black, near-infrared absorbing dye, near-infrared absorbing pigment, metal nanoparticles, conjugated polymer, or a combination thereof. The water can be present in the detailing agent at from about 40 wt % to about 96 wt %. The detailing agent includes 60 wt % to about 94 wt % water, from about 5 wt % to about 35 wt % organic cosolvent, and from about 1 wt % to about 20 wt % organosilane, based on a total weight of the detailing agent; and wherein the fusing agent includes from about 60 wt % to about 94 wt % water, from about 5 wt % to about 35 wt % organic cosolvent, and from about 1 wt % to about 20 wt % radiation absorber, based on a total weight of the fusing agent.

In another example, a three-dimensional printing kit can include a fusing agent, a detailing agent, and a powder bed material. The fusing agent can include water and a radiation absorber that absorbs radiation energy and converts the radiation energy to heat. The detailing agent includes a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups. The organosilane can be present in the detailing agent at from about 1 wt % to about 20 wt %. The powder bed material can include from 60 wt % to 100 wt % polymeric particles. In examples herein, the organosilanes can be self-crosslinkable to form polysiloxanes that are chemically independent relative to the polymeric particles. The polymeric particles can include polyamide, polyethylene, thermoplastic polyurethane, polypropylene, thermoplastic polyamide, polyester, polycarbonate, polyether ketone, polyacrylate, polystyrene, wax, or a combination thereof. The organosilanes can be dialkoxysilanes, trialkoxysilanes, or a combination thereof, in one example. The organosilane and the surfactant can be present in the detailing agent at a weight ratio from about 4:1 to about 1:1.

In another example, a method of making a three-dimensional printed article can include iteratively applying individual build material layers of a powder bed material including polymer particles to a powder bed, and based on a three-dimensional object model, selectively applying a fusing agent onto individual build material layers, wherein the fusing agent comprises water and a radiation absorber. The method can further include, based on the three-dimensional object model, selectively applying a detailing agent onto individual build material layers laterally at a border between a first area where the powder bed material is contacted by the fusing agent and a second area where the powder bed material is not contacted by the fusing agent. The detailing agent can include a lipophilic phase discontinuously dispersed within an aqueous phase by a surfactant, wherein the lipophilic phase includes an organosilane having a central silicon atom coupled to a C6 to C24 hydrocarbon and multiple hydrolyzable groups. The organosilane can be present in the detailing agent at from about 1 wt % to about 20 wt %. In further detail, the method includes exposing the powder bed material to energy to selectively fuse the polymer particles in contact with the radiation absorber to form a fused polymer matrix at individual build material layers. In one example, the organosilanes can form polysiloxanes at the border that are chemically independent relative to the polymeric particles. The elevated temperature can be from about 100° C. to about 250° C.

In addition to the examples described above, including the multi-fluid kits, the three-dimensional printing kits, and the methods of making three-dimensional printed articles, features will be described in greater detail below. It is also noted, however, that when discussing the multi-fluid kits, the three-dimensional printing kits, and/or the methods, these discussions can be considered applicable to the other examples, whether or not they are explicitly discussed in the context of that example. Thus, for example, in discussing a specific organosilane compound related to a multi-fluid kit, such disclosure is also relevant to and directly supported in the context of the three-dimensional printing kits, the methods of making three-dimensional printed articles, and vice versa.

Multi-fluid Kit for Three-dimensional Printing

In accordance with the present disclosure, a multi-fluid kit 100 for 3D printing is shown by example in FIG. 1. In this example, the multi-fluid kid can include a fusing agent 110 and a detailing agent 120. The fusing agent can include water and a radiation absorber that can absorb radiation energy and convert the radiation energy to heat. The detailing agent can include a lipophilic phase discontinuously emulsified within an aqueous phase by a surfactant, wherein the lipophilic phase includes an organosilane having a central silicon atom coupled to an aliphatic or alicyclic hydrocarbon and multiple hydrolyzable groups, wherein the organosilane is present in the detailing agent at from about 1 wt % to about 20 wt %, from about 2 wt % to about 15 wt %, or from about 3 wt % to about 10 wt %, for example. The term "C6 to C24 hydrocarbon" refers to both aliphatic hydrocarbon chains, alicyclic hydrocarbons, and combinations of aliphatic hydrocarbon chains and alicyclic hydrocarbon, but does not include aromatic hydrocarbons. Thus, the hydrocarbons can be aliphatic or alicyclic. In one example, hydrocarbon may also be saturated. The aliphatic hydrocarbon chains can be either branched or straight-chained aliphatic hydrocarbons, alicyclic hydrocarbons, or a combination of aliphatic and alicyclic hydrocarbons, for example. In addition to the aliphatic or alicyclic, the central silicon also includes multiple hydrolyzable moieties or groups, e.g., alkoxy groups, halogenated group, etc., that may be involved in becoming linked together by condensation to form the polysiloxanes when the emulsion becomes disrupted upon printing into the powder bed material.

Fusing Agents

With specific reference to the radiation absorber present in the fusing agent 110, example compounds that can be used include a metal dithiolene complex, carbon black, a near-infrared absorbing dye, a near-infrared absorbing pigment, metal nanoparticles, a conjugated polymer, or a combination thereof. The fusing agent can be formulated with a radiation absorber (and ingredients other than the water, in some examples), to be colorless, though in other examples, fusing agent can have color, or can be black, grey, and/or white, for example.

In some examples, the fusing agent 110 can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3, 4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used in the fusing agent 110. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments that can be used in the fusing agent 110 include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber in the fusing agent 110 can include a metal dithiolene complex. Transition metal dithiolene complexes can exhibit a strong absorption band in the 600 nm to 1600 nm region of the electromagnetic spectrum. In some examples, the central metal atom can be any metal that can form square planar complexes. Non-limiting specific examples include complexes based on nickel, palladium, and platinum.

A dispersant can be included in the fusing agent 110 in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent 110 can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

Detailing Agents

Figure 5:
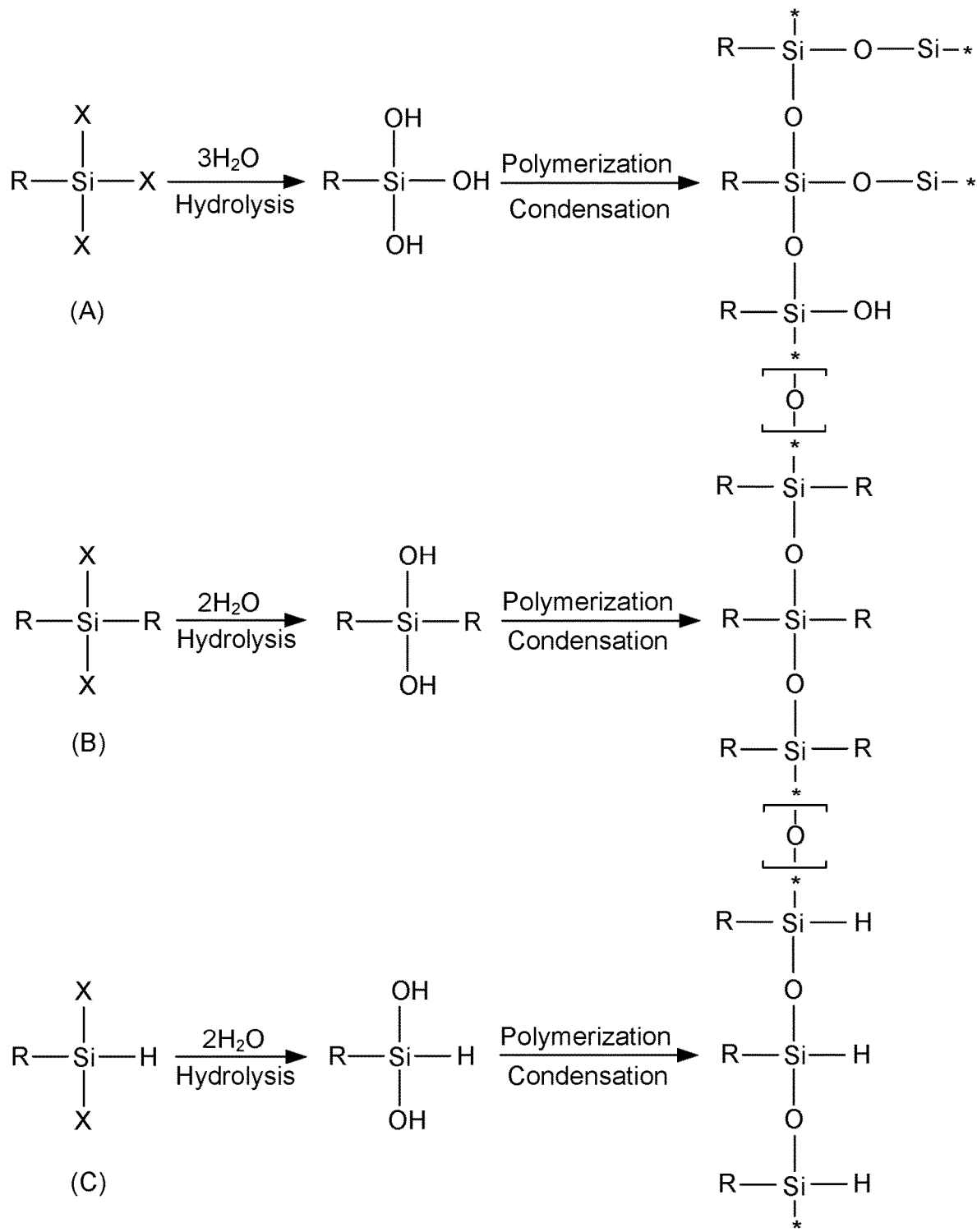
FIG. 5 schematically depicts a variety of example reaction self-crosslinking reactions that can occur in forming the polysiloxanes in a detailing agent printed in a powder bed material in accordance with the present disclosure.

The detailing agent can include water and organosilanes. In accordance with the present disclosure, the organosilanes can be included in the lipophilic phase of an emulsion. The organosilanes can include an organosilane compound with a central silicon having a lipophilic (hydrophobic) moiety at one or two of the four locations of the central silicon. Thus, as there are four positions available on a central silicon, there can be one or two lipophilic moieties, and there can be two or three hydrolyzable moieties. Three examples of organosilane compounds are shown in FIG. 5 by way of example, where R represents lipophilic moieties and X represents hydrolyzable moieties. For example, organosilane compound (A) includes one lipophilic moiety and three hydrolyzable moieties; organosilane (B) includes two lipophilic moiety and two hydrolyzable moieties; and organosilane (C) includes one lipophilic moiety and two hydrolyzable moieties. Organosilane (C) also includes hydrogen at one of the four positions on the central silicon atom. In this example, the lipophilic moiety, represented by R, can independently include an aliphatic or alicyclic hydrocarbon, e.g., C6 to C24 straight-chained alkyl, branched alkyl, alicyclic, or a combination thereof. In some examples, the aliphatic or alicyclic hydrocarbon can be substituted with a heteroatom, such as oxygen, sulfur, or nitrogen, but such a substitution can be minimal, e.g., one or two locations, and if present, the lipophilic moiety still provides enough hydrophobicity to the compound for it to become emulsified into a discontinuous phase within the detailing agent in the present of the surfactant. Though not shown in FIG. 5, in some examples, there can be additional organosilane compounds present, such as tetraalkoxysilanes, for example. If present, they can be included at from about 0.01 wt % to about 5 wt %, from about 0.05 wt % to about 3.5 wt %, from about 0.1 wt % to about 2 wt %, or from about 0.01 wt % to about 1 wt %, based on a total weight of the detailing agent. In some examples, there are no tetraalkoxysilanes present. Notably, though the various polysiloxanes are shown as linked together with a siloxane group with the oxygen shown in brackets, e.g., [—O—], this is provided by way of example, and the linking polymer therebetween can be longer, or the various structures formed can be unlinked, or there may not be all of the structures shown at (A)-(C) present in a common formulation. These structures are provided by way of example to illustrate various possible combinations and structures that can be formed.

Formula I below provides an example organosilane that can be formulated and dispersed as a discontinuous phase of a detailing agent in accordance with the present disclosure, as follows:

$$R_n—Si—X_p \qquad \text{Formula I}$$

where R includes a C6 to C24 aliphatic or alicyclic hydrocarbon; X is a hydrolyzable moiety, n is 1 or 2, and p is 2 or 3. The hydrolyzable moiety can be alkoxy, e.g., methoxy, ethoxy, etc.; or halogen.

Two specific examples of organosilane compounds that can be used in accordance with the present disclosure are shown as Formulas II and III below.

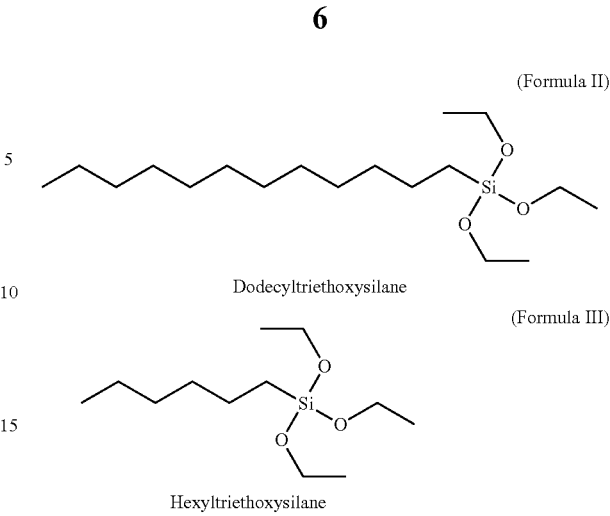

In these two particular examples, Formulas II and III depict triethoxysilanes, but it is understood that either could likewise be diethoxysilanes, trimethoxysilanes, dimethoxysilanes, trichlorosilanes, dichlorosilanes, tribromosilanes, dibromosilanes, etc. The ethoxysilanes could likewise be propyloxy silanes or methoxy silanes. One reason triethoxysilanes are shown and described is because they may exhibit a slow enough rate of hydrolysis that they react at a rate that may coincide well with printing speeds, for example. Methoxysilanes react more quickly and halosiloxanes, for example, may not be as environmentally friendly as alkoxysilanes, but may still be used effectively in some examples.

In preparing a detailing agent including an emulsified organosilane of the present disclosure, the following general method can be used, by way of example:

Combine water and surfactant, and in some instances an acid or base, e.g., acetic acid. Hydrolysis of silanes to a silanol may occur readily, but the rate of reaction can be modulated by addition of the acid and/or base, e.g., sped up in speed.

Add the organosilane with a lipophilic moiety, such as that described by example in Formula I, dropwise slowly over time.

Stir the mixture for several hours, e.g., 72+ hours in some examples.

If a triethoxysilane is being used, the scent of EtOH indicates hydrolysis of the silanol may be occurring.

Using this methodology, the two triethoxysilanes shown and described in Formulas II and III were prepared with the addition of an acid to increase the reaction rate, but these materials may be prepared without adding the acid.

Referring once again to FIG. 5, as shown, a hydrolysis reaction can introduce hydroxyl groups to the organosilane compound, which can then be polymerized or condensed to form any of a number of oligomeric or polymeric siloxanes, where are referred to herein collective as "polysiloxanes." The rate at which hydrolysis occurs can be dependent on the number and structure of hydrolyzable groups. Hydrolysis can occur within the detailing agent prior to application to the powder bed material, for example. Application of heat to the powder bed can, for example, promote the formation of self-polymerized polysiloxanes structures such as that shown by way of example in FIG. 5. pH modification when jetted into a layer of the powder bed material can also facilitate formation of the polysiloxanes.

In accordance with examples of the present disclosure, the powder bed material, and particularly the polymer particles used in the powder bed material, can be selected or formulated to avoid surface hydroxyl groups. In one example, the powder bed material is devoid of surface hydroxyl groups. In another example, if some surface hydroxyl groups are present, they can be presented at a de minimis concentration, e.g., due to impurities or polymers with hydroxyl end groups, but not throughout the polymer chain, etc., so that the polysiloxanes do not substantially interact or bond with the 3D article being printed enough that the polysiloxanes cannot be easily removed by wiping, washing, or other simple procedure. In some examples, a more vigorous post-processing step can occur, such as sand blasting or other similar methodology. Thus, in the absence (or substantial absence) of surface hydroxyl-containing powder bed material, self-condensation of silanols are free to produce the polysiloxanes, providing a polymeric detailing compound to form that is operable in a thermally cooling detailing agent (due to the water and/or other solvents) as well as by creating a physical barrier at a surface of the 3D printed article from the polysiloxanes that are formed. In one example of the present disclosure, the use of trialkoxysilanes in particular as the monomeric unit with a lipophilic moiety, or R group, as shown at (A) in FIG. 5, hydrolysis can occur in the detailing agent in preparation for applying to the powder bed material, and after application, when the emulsion becomes disrupted, condensation can occur within the powder build material forming the physical barrier. By slowing hydrolysis with these considerations, some printability issues can be avoided in some specific examples. The formation of some concentration of polysiloxanes in solution is acceptable, however, provided the polysiloxanes can remain in solution, for example.

In one example, the organosilanes can be present in the detailing agent at from about 1 wt % to about 20 wt %, from about 2 wt % to about 15 wt %, or from about 2 wt % to about 10 wt %, for example. The water can be present in the detailing agent at from about 50 wt % to about 99 wt %, as an example. For example, the detailing agent can include from about 60 wt % to about 94 wt % water, from about 5 wt % to about 35 wt % organic cosolvent, and from about 1 wt % to about 10 wt % of the organosilanes, with weight percentages based on a total weight of the detailing agent.

The water can provide cooling of the powder bed material, and thus contribute to a thermal detailing function. The organosilanes, on the other hand, due to the presence of the multiple hydrolyzable moieties attached to the central silicon atom, can be self-crosslinkable to form polysiloxanes. When the polymeric particles of the powder build material are selected or formulated such that there are no surface hydroxyls, or if present, at a de minimis surface concentration of hydroxyl groups, so that the polysiloxanes formed can remain substantially chemically independent relative to the polymeric particles. The term "chemically independent" does not preclude all surface polymeric particle surface reactions with the organosilanes, as there may be impurities or other reasons that there are de minimis concentrations of surface hydroxyls present within the powder build material. By "chemically independent," what is meant is that whatever bonding may occur at a surface of the printed 3D article, the bonding is insufficient to permanently incorporate the polysiloxanes formed onto a surface of the article. In other words, the polysiloxanes form within the powder at a surface of the printed 3D article to provide detailing properties to the article without becoming part of the 3D article that is being printed.

In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused, as well as form a physical barrier as the organosilane forms a polymer along the edges without substantial reaction or interaction with the portion to be fused.

In some examples, the detailing agent 120 can be mostly water. In a particular example, the detailing agent can be about 80 wt % or more. In further examples, the detailing agent can be about 90 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent 120 can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In some examples, the emulsified organosilane of the lipophilic phase can be formulated in the detailing agent 120 with a secondary detailing compound, such as a solvent that evaporates at the temperature of the powder bed. In certain examples, if used, the second detailing compound can be water and/or an organic co-solvents. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N, N-dimethyl acetamide, and combinations thereof.

In some examples, the detailing agent and the fusing agent 110 can be applied onto the powder bed material using a fluid application device, such as a jetting device or fluid ejector. Accordingly, in some examples, the fusing agent can be formulated to give the fusing agent good jetting or ejection performance, e.g., piezo, thermal, etc. Ingredients that can be included in the fusing agent to provide good performance can include a liquid vehicle with water, and in some instances, organic co-solvent. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof. In accordance with the present disclosure, since the organosilanes in the detailing agent have the ability to form polysiloxanes, thus providing a physical polysiloxane barrier at the border between the fused or fusing three-dimensional article or layer thereof, and the powder bed material that is not fused.

Liquid Vehicles for Fusing Agents or Detailing Agents

In some examples, the liquid vehicle formulation of the fusing agent 110 and/or the detailing agent 120 can be water or can be an aqueous liquid vehicle that includes water and a co-solvent or co-solvents present in total at from about 1 wt % to about 50 wt %, depending on the application architecture, e.g., jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

Classes of co-solvents that can be used in the fusing agent 110 and/or the detailing agent 120 can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

The fusing agent 110 and/or the detailing agent 120 can include a surfactant or multiple surfactants such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be used to enhance certain properties of the fusing agent and/or the detailing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCAR-CIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt.

Materials Kits for 3D Printing

Figure 2:
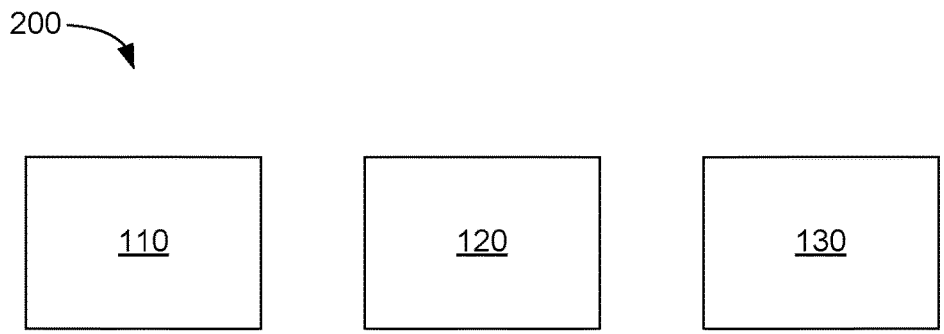
FIG. 2 is a schematic view an example three-dimensional printing kit in accordance with examples of the present disclosure.

In another example, a materials kits 140 for 3D printing is shown by example in FIG. 2. In this example, the materials kits can include build material and multiple fluid agents. More specifically, the materials kit for 3D printing can include a powder bed material 104, a fusing agent 110, and a detailing agent 120. In particular, the fusing agent can be selectively applied to the powder bed material and layers of the powder bed material can be fused to form a 3D printed article. The detailing agent can be applied at or about edges of the 3D printed article as it is being formed to provide good detail at boundaries of the 3D printed article.

Powder Bed Materials

As noted previously, the materials kit for 3D printing can include powder bed material, fusing agent, and detailing agent packaged together, or they can be packaged separately for assembly and use together in a common system. In other examples, the powder bed material can be in the form of a container or bag of loose powder bed material. In still other examples, the powder bed material can be in a cartridge designed to fit in a specific 3D printing system to be distributed in layers as described herein. Similarly, the fusing agent and/or the detailing agent can be packaged for loading into a print cartridge, e.g., in a bottle, of the fusing agent and/or the detailing agent can be packaged within a cartridge designed for use with a specific 3D printing system.

In further detail, it is noted that the fusing agent and the detailing agent can be as described previously in the context of the multi-fluid kits. However, with more specific reference to the powder bed material, this material can include polymer particles having a variety of shapes, such as spherical particles or irregularly-shaped particles. The polymer particles can be present in the powder bed material at from about 60 wt % to 100 wt %, from about 80 wt % to 100 wt % polymer particles, from about 90 wt % to 100 wt % polymer particles, from about 95 wt % to 100 wt % polymer particles, or from about 60 wt % to about 99 wt % polymer particles. In some examples, the polymer powder can be capable of being formed into 3D printed objects with a resolution of about 20 μm to about 100 μm, about 30 μm to about 90 μm, or about 40 μm to about 80 μm. As used herein, "resolution" refers to the size of the smallest feature that can be formed on a 3D printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from 40 μm to about 80 μm.

The polymer powder can have a melting or softening point from about 70° C. to about 350° C. In further examples, the polymer can have a melting or softening point from about 150° C. to about 200° C. A variety of polymer particles with melting points or softening points in these ranges can be used, including thermoplastic polymer particles. For example, the polymer powder can include polyamide 6 powder, polyamide 9 powder, polyamide 11 powder, polyamide 12 powder, polyamide 6/6 powder, polyamide 6/12 powder, polyethylene powder, wax, thermoplastic polyamide, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or a mixture thereof. In a specific example, the polymer powder can be polyamide 12, which can have a melting point from about 175° C. to about 200° C. In another specific example, the polymer powder can be thermoplastic polyurethane.

The polymer particles can also, in some cases, be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, if other components are present such as a filler, a weight ratio of polymer particles to filler particles can be from about 100:1 to about 1:2 or from about 5:1 to about 1:1.

Three-Dimensional Printing Methods

Figure 3A:
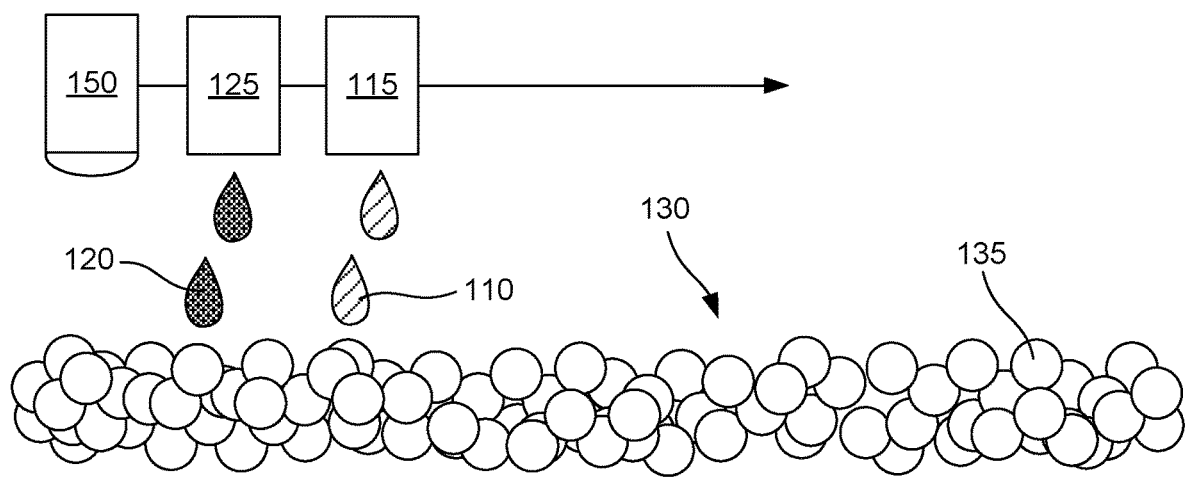
FIGS. 3A-3C show a schematic view of an example three-dimensional printing process using an example three-dimensional printing kit in accordance with examples of the present disclosure.

FIGS. 3A to 3C and FIG. 4 illustrate methods of printing or forming three-dimensional articles in accordance with the present disclosure. In FIG. 3A, for example, a fusing agent 110 is shown in the form of an ejected droplet from a fusing agent ejector 115, a detailing agent 120 shown in the form of an ejected from a detailing agent ejector 125, and a powder bed material 130, which includes polymer particles 132, is also shown. Thus, in an example, the fusing agent and the detailing agent can be ejected or jetted onto the powder bed, which includes a layer of the powder bed material 135, e.g., polymer particles and in some instances other particles may be present, where the fusing agent promotes fusing of the polymer particles together (inter-particulate and layer to layer), and the detailing agent can provide evaporative cooling as well as form a physical barrier that remains unattached to the fusing or fused three-dimensional object that is formed. These fluid ejectors can move across the layer of powder bed material to selectively jet fusing agent on areas that are to be fused, while the detailing agent can be jetted onto areas that are to be cooled and where a physical barrier may benefit the print resolution of the article. A radiation source 150 can also move across the layer of powder bed material.

In some cases, the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing agent can further include a solvent that evaporates when it comes into contact with the powder bed at the preheat temperature, thereby cooling the printed portion of the powder bed through evaporative cooling, which provides a secondary detailing function in addition to the formation of the polysiloxane physical barrier between the unfused powder bed material and the portion of the powder bed material where fusion occurs. Thus, in some examples, the detailing agent can be a fluid that reduces a temperature of the polymer powder on which the detailing agent is printed. In particular, a maximum temperature reached by the powder during exposure to electromagnetic energy can be less in the areas where the detailing agent is applied.

Figure 3B:
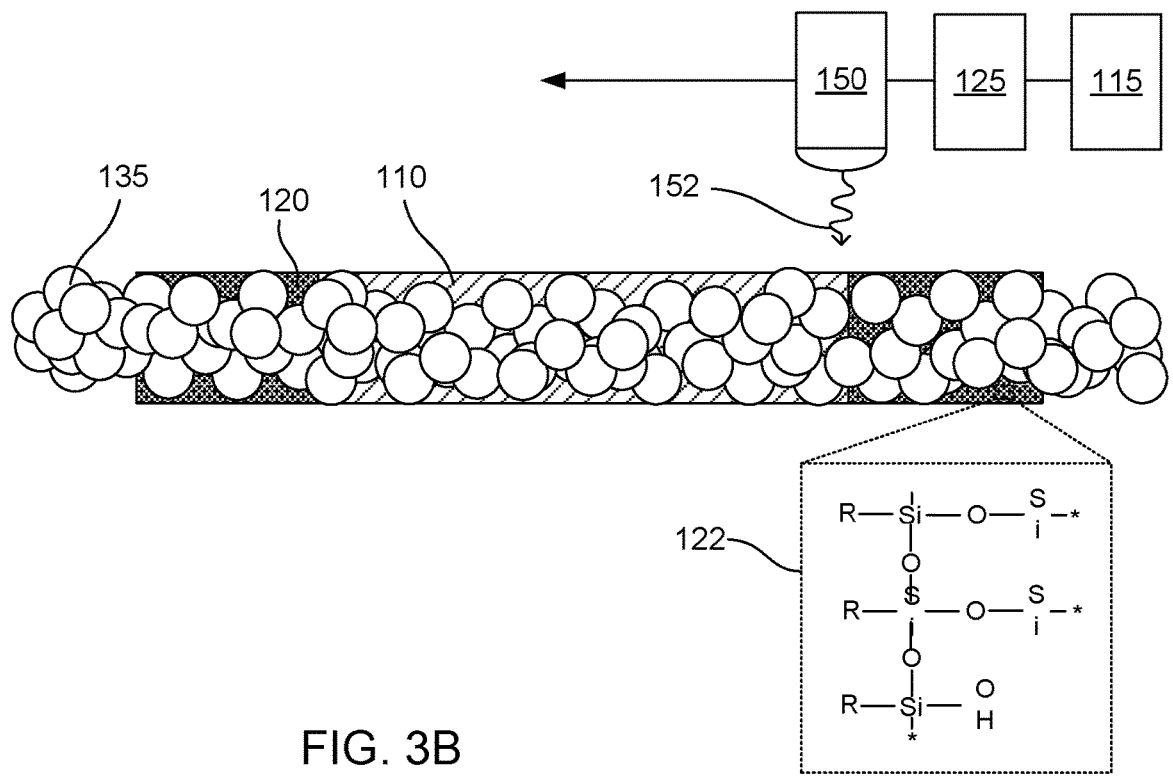

FIG. 3B shows the layer of powder bed material 130 after the fusing agent 110 and the detailing agent 120 have been jetted onto respective areas of the powder bed around the article that is being printed on a layer by layer basis. The fusing agent is jetted where the article is to be fused. In this figure, the radiation source 150 is shown emitting radiation 152 toward the layer of powder build material shown, which is part of a powder bed (not shown in full but shown in part as one of the layers of the powder bed).

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 seconds to about 10 seconds per pass.

Figure 3C:
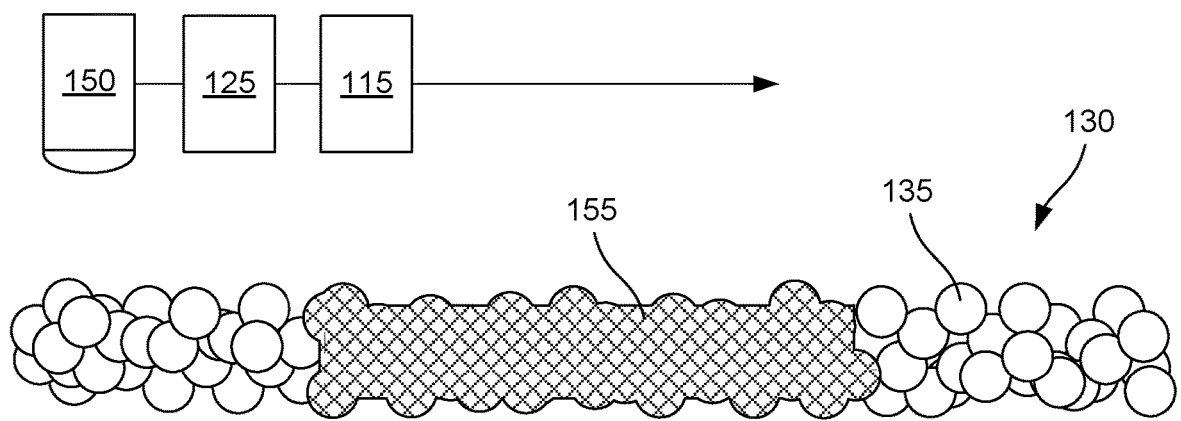

FIG. 3C shows the layer of powder bed material 130 with a fused portion 155 where the fusing agent was jetted and the radiation (152 of FIG. 3B) has interacted with the fusing agent to cause the polymer particles 135 of the powder bed material to fused. In this example, a combination of the presence of the radiation absorber and the radiation together raise the temperature to cause the polymer particles to fuse and form the article. The area where the detailing agent was jetted remains as loose polymer particles, due in part to the cooling effect of the detailing agent and the physical barrier of the polysiloxane formed from the organosilane present therein.

Thus, the detailing agent applied to the powder build material at location can provide thermal cooling as well as the formation of a polysiloxanes to provide detailing to a surface of the 3D printed article that is formed within the powder bed material. The formation and structure of the polysiloxanes is shown and described by way of example in FIG. 5, in Formula 1, as well as in the Examples hereinafter.

Figure 4:
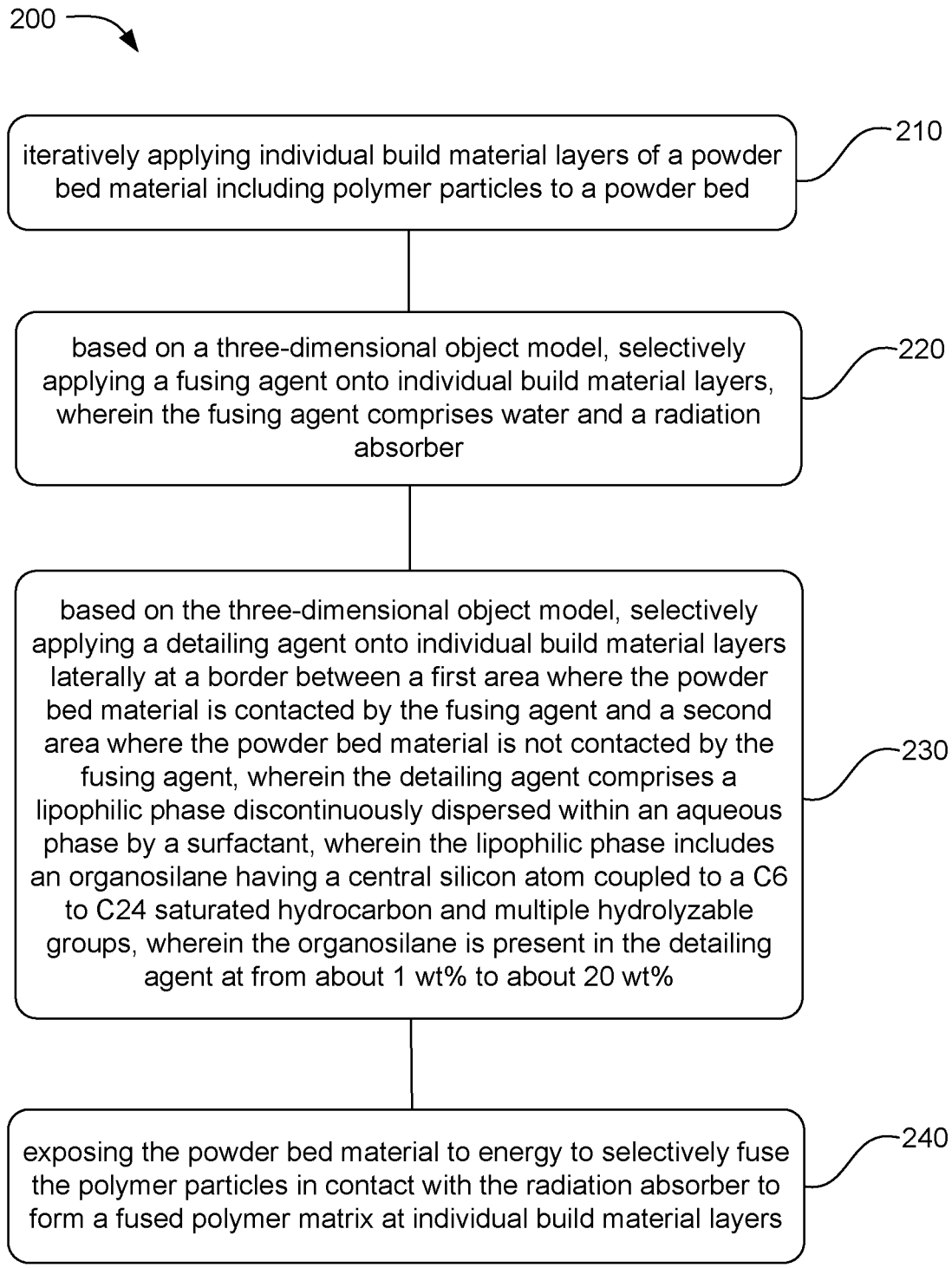
FIG. 4 is a flowchart illustrating an example method of making a three-dimensional printed article in accordance with examples of the present disclosure.

In further detail, this printing technology can be implemented in accordance with a method 200 of three-dimensional printing shown in FIG. 4, by way of example. The method can include iteratively applying 210 individual build material layers of a powder bed material including polymer particles to a powder bed, and based on a three-dimensional object model, selectively applying 220 a fusing agent onto individual build material layers, wherein the fusing agent comprises water and a radiation absorber. The method can further include, based on the three-dimensional object model, selectively applying 230 a detailing agent onto individual build material layers laterally at a border between a first area where the powder bed material is contacted by the fusing agent and a second area where the powder bed material is not contacted by the fusing agent. The detailing agent can include a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups. The organosilane can be present in the detailing agent at from about 1 wt % to about 20 wt %. In further detail, the method includes exposing 240 the powder bed material to energy to selectively fuse the polymer particles in contact with the radiation absorber to form a fused polymer matrix at individual build material layers. In one example, the organosilanes can form polysiloxanes at the border that are chemically independent relative to the polymeric particles. The elevated temperature can be from about 100° C. to about 250° C.

The 3D printed article can be formed by applying, e.g., digitally ejecting or jetting, etc., a fusing agent onto layers of powder bed material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article. Other information may also be included, such as structures to be formed of additional different materials or color data for printing the article with various colors at different locations on the article. The 3D object model may also include features or materials specifically related to ejecting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of the organosilane applied, and so on. All this information can be contained in a single 3D object file or a combination of multiple files. The 3D printed article can be made based on the 3D object model. In certain examples, software can be used to convert a 3D object model to instructions for a 3D printer to form the article by building up individual layers of powder bed material.

Definitions

It is noted that, as used in this specification and the appended claims, the singular forms "a," "an," and "the" include plural referents unless the context clearly dictates otherwise.

As used herein, "applying" when referring to fusing agent and/or detailing, for example, refers to any technology that can be used to put or place the respective fluid agent on or into a layer of powder bed material for forming 3D articles. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture, for example. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are identified as a separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Preparation of Fusing Agent (FA)

A fusing agent formulation was prepared in accordance with Table 1, as follows:

TABLE 1

| Fusing Agent Formulation (FA) | |
| --- | --- |
| Component | Concentration (wt %) |
| Near-IR Radiation Absorber | 5 |
| Organic Co-Solvent | 27 |
| Surfactant | 1.28 |
| Biocide | 0.35 |
| Buffer | 0.1 |
| Water | Balance |

Example 2—Organosilane Emulsion Evaluation and Preparation of Detailing Agents

Several different organosilane formulations were prepared for screening to determine some of the better candidates for use as a detailing agent. Of the formulations prepared, those found in Table 2 below were further evaluated. Notably, various concentrations of nonionic surfactant were included, and in these examples, acetic acid was used to speed up the reaction. However, it is noted that some formulations prepared did not use any acetic acid.

TABLE 2

| Organosilane Emulsions | | | | |
| --- | --- | --- | --- | --- |
| Sample ID | Organosilane ID | Wt % Organosilane | Wt % Nonionic Surfactant | Wt % Acetic Acid |
| DA1 | Hexyltriethoxysilane | 10 | 4 | 1 |
| DA2 | Hexyltriethoxysilane | 10 | 6 | 1 |
| DA3 | Hexyltriethoxysilane | 10 | 6 | 0.5 |
| DA4 | Hexyltriethoxysilane | 10 | 7 | 1 |
| DA5 | Hexyltriethoxysilane | 10 | 8 | 1 |
| DA6 | Hexyltriethoxysilane | 20 | 8 | 2 |
| DA7 | Hexyltriethoxysilane | 20 | 16 | 2 |

A visual inspection found that after several days to allow for settling, many of many of these samples remained homogenous, and thus were further evaluated for stability by admixing at a 1:1 weight ratio in a liquid vehicle at a 1:1 weight ratio to formulate detailing agents having 5 wt % organosilane present as an emulsified discontinuous phase. Specifically, Sample IDs 1-5 were formulated into a detailing agent formulation in accordance with the following formulation shown in Table 3, as follows:

TABLE 3

| Detailing Agents Prepared (DA1-5) | |
| --- | --- |
| Component | Wt % |
| Organosilane | 5 |
| Organic Cosolvent | 19 wt % |
| Surfactant | 0.85 |
| Chelating Agent | 0.02 |
| Biocide | 0.2 |
| Anti-Koga Additive | 0.5 |
| Buffer | 0.2 |
| Water | Balance |

After a week at 60 C, the various dispersions formulated in accordance with Table 3 were found to be relatively stable at from about 20 nm to about 40 nm in droplet size within the emulsion. The best candidate for further evaluation was from Sample ID DA5. However, it is noted that this is merely one specific detailing agent formulation, and other different detailing agents would likely provide a basis for selecting a different emulsion from the Sample IDs of Table 1, or other formulation not specifically prepared in Table 1. With this specific detailing agent liquid vehicle, DA5 gave a homogenous stable particle even after 4 weeks at 60° C. This detailing agent emulsion formulation has also been prepared at various scale sized, e.g., 5 to 200 g total mass, with similar results.

Example 3—Detailing Agent Performance

Detailing agent DA5 was found to exhibit good jettability from thermal inkjet architecture. Specifically, no decap issues were issues were seen at the printing speeds used in typical 3D printing processes.

Computer 3D object models were used to prepare two different types of articles designed to evaluate the effectiveness of detailing agent. One diagnostic article is referred to herein as a "gap checker" and the other diagnostic article is referred to herein as a "holey plate." In these evaluations, the powder bed material selected for use was polyamide-12 powder with a small amount of titanium dioxide filler, e.g., 1-5 wt %.

The gap checker was designed to print a horizontal substrate or base with several pairs of vertical tiles (square) extending upward therefrom. The article was designed so that the pairs of vertical tiles had a gap therebetween (major surface facing major surface separated by the gap) ranging in distance between tiles of a pair from 0.1 mm to 0.5 mm. Detailing agent was deposited between the two plates of the various pairs during the build process. For the evaluation, DA17 was prepared in accordance with the present disclosure and compared against a detailing agent that utilizes water and solvent for cooling (Control DA). Control DA did not include an organosilane. Then design of the "gap checker" article was such that if there was adequate separation between the individual pairs of plates, one of the plates could be remove or separated from the other by breaking one of the plates away from the other while keeping the other plate undamaged as attached to the horizontal substrate or base. To achieve this, one of the two vertical plates of the various pairs was not printed to be connected to the horizontal substrate, e.g., it was connected to the other vertical plate with detailing agent and powder build material therebetween. Thus, the more tiles that can be separated from their opposing tile of the pair, the better the gap clearance. For example, for a pair of tiles that can be separated down at 0.2 mm, then that would be considered to be better performance for the detailing agent than if the pairs of tiles could only be separated down to 0.3 mm. To account for variability, the parts were printed twice in both a default orientation and a 180° rotated orientation to account for potential temperature non-uniformity in the powder bed material as related to the 3D printing apparatus. The tile pairs printed with DA17 therebetween was able to provide acceptable gap clearance down to 0.2 mm, failing at 0.1 mm. the tile pairs printed with the Control DA therebetween was able to provide acceptable gap clearance down to 0.3 mm or 0.4 mm, depending on the orientation of the printed part. Thus, the gap checker confirmed that the presence of the emulsified organosilane provided better gap clearance than a detailing agent that relies on temperature cooling for its detailing functionality.

Figure 6:
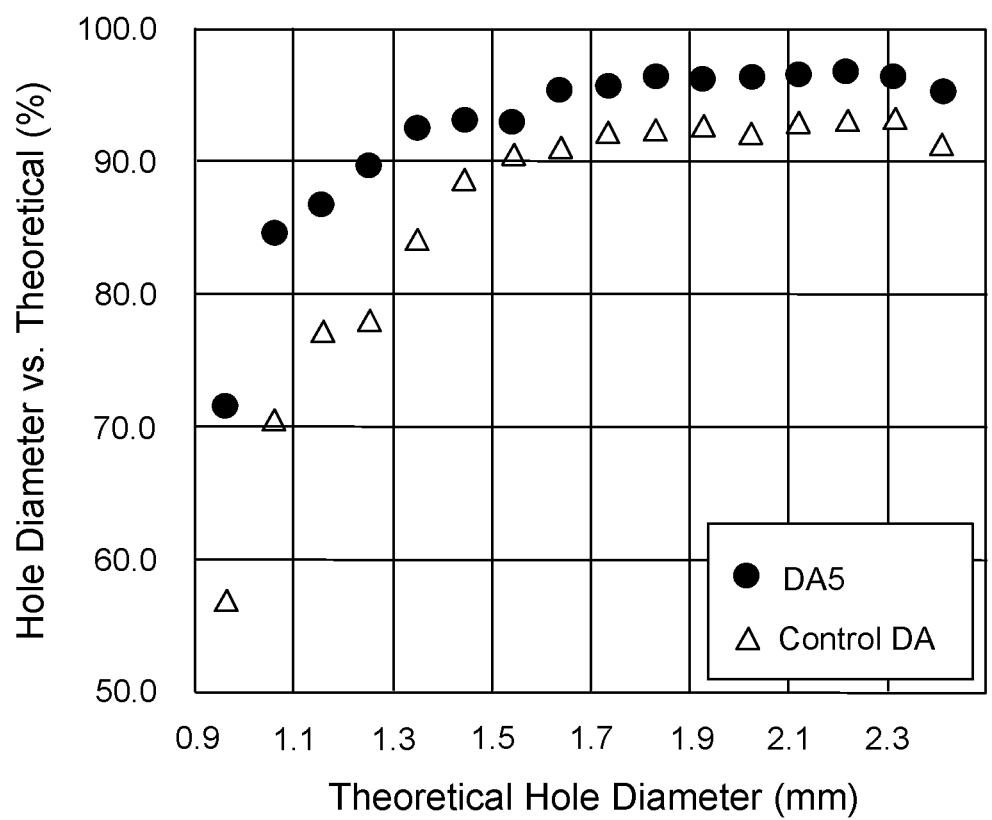
FIG. 6 is a graph depicting hole clearance performance of an example detailing agent compared to a control detailing agent in accordance with the present disclosure.

The other diagnostic article was a hole-containing plate, or "holey plate," which is an article that evaluates hole clearance provided by detailing agent. In this experiment, the article printed based on the three-dimensional object model contained two rows of holes with increasing diameter ranging from 0.1 mm to 2.41 m (in about 0.1 mm increments) was printed to determine the extent to which each agent could provide hole clearance. For this evaluation, the closer in actual hole diameter to expected (or modeled) hole diameter, the better the dimensional accuracy. Furthermore, if more holes that can be cleared going from smallest to larges, the smaller the feature sizes that can be achieved using the detailing agent. More specifically, one row of holes that was printed used DA17, and a second row of holes used Control DA. Both agents were incorporated into the same article (in two different rows), and thus, the comparison is believed to be reflective of the performance of the two different detailing agents and hole clearing efficiency. Like with the gap checker evaluation above, it was found that DA5 was closer to its theoretical or modeled hole size than the Control DA. A graph of the results is shown in FIG. 6.

Both the gap checker article data and the holey plate article data, the evidence suggests that the presence of an organosilane in a detailing agent as described herein may provide access to smaller feature sizes than when using detailing agent without an organosilane present.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A multi-fluid kit for three-dimensional printing, comprising:
   a fusing agent comprising water and a radiation absorber, wherein the radiation absorber absorbs radiation energy and converts the radiation energy to heat; and
   a detailing agent comprising a lipophilic phase discontinuously emulsified within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the detailing agent in an amount ranging from about 1 wt % to about 20 wt %.

2. The multi-fluid kit of claim 1, wherein the organosilane is a trialkoxyorganosilane compound including a C6 to C14 aliphatic or alicyclic hydrocarbon.

3. The multi-fluid kit of claim 1, wherein the organosilane is present in the detailing agent in an amount ranging from about 2 wt % to about 10 wt %.

4. The multi-fluid kit of claim 1, wherein the organosilane and the surfactant are present in the detailing agent at a weight ratio of from about 4:1 to about 1:1.

5. The multi-fluid kit of claim 1, wherein the C6 to C24 aliphatic or alicyclic hydrocarbon is directly coupled to a heteroatom selected from the group consisting of oxygen, nitrogen, sulfur, and a combination thereof.

6. The multi-fluid kit of claim 1, wherein the radiation absorber is selected from the group consisting of a metal dithiolene complex, carbon black, near-infrared absorbing dye, near-infrared absorbing pigment, metal nanoparticles, conjugated polymer, and a combination thereof.

7. The multi-fluid kit of claim 1, wherein the water is present in the detailing agent in an amount ranging from about 40 wt % to about 96 wt %.

8. The multi-fluid kit of claim 1, wherein:
   the detailing agent includes from about 60 wt % to about 94 wt % of water, from about 5 wt % to about 35 wt % of an organic cosolvent, and from about 1 wt % to about 20 wt % of the organosilane, based on a total weight of the detailing agent; and
   the fusing agent includes from about 60 wt % to about 94 wt % water, from about 5 wt % to about 35 wt % of an organic cosolvent, and from about 1 wt % to about 20 wt % of the radiation absorber, based on a total weight of the fusing agent.

9. A three-dimensional printing kit, comprising:
   a fusing agent comprising water and a radiation absorber, wherein the radiation absorber absorbs radiation energy and converts the radiation energy to heat;
   a detailing agent comprising a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the detailing agent in an amount ranging from about 1 wt % to about 20 wt %; and
   a powder bed material including 60 wt % to 100 wt % of polymeric particles,
   wherein the organosilane is self-crosslinkable to form a polysiloxane that is chemically independent relative to the polymeric particles.

10. The three-dimensional printing kit of claim 9, wherein the polymeric particles are selected from the group consisting of polyamide particles, polyethylene particles, thermoplastic polyurethane particles, polypropylene particles, thermoplastic polyamide particles, polyester particles, polycarbonate particles, polyether ketone particles, polyacrylate particles, polystyrene particles, wax particles, and a combination thereof.

11. The three-dimensional printing kit of claim 9, wherein the organosilane is selected from the group consisting of dialkoxysilanes, trialkoxysilanes, and a combination thereof.

12. The three-dimensional printing kit of claim 9, wherein the organosilane and the surfactant are present in the detailing agent at a weight ratio of from about 4:1 to about 1:1.

13. A method of making a three-dimensional printed article, the method comprising:
   iteratively applying individual build material layers of a powder bed material including polymer particles to a powder bed;
   based on a three-dimensional object model, selectively applying a fusing agent onto individual build material layers, wherein the fusing agent comprises water and a radiation absorber;

based on the three-dimensional object model, selectively applying a detailing agent onto individual build material layers laterally at a border between a first area where the powder bed material is contacted by the fusing agent and a second area where the powder bed material is not contacted by the fusing agent, wherein the detailing agent comprises a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the detailing agent in an amount ranging from about 1 wt % to about 20 wt %; and exposing the powder bed material to energy to selectively fuse the polymer particles in contact with the radiation absorber to form a fused polymer matrix at individual build material layers.

14. The method of claim 13, wherein the organosilane forms a polysiloxane at the border that is chemically independent relative to the polymeric particles.

15. The method of claim 13, wherein during the exposing, the energy and the radiation absorber together raise a temperature of the polymer particles in contact with the radiation absorber to a range of from about 100° C. to about 250° C. to fuse the polymer particles in contact with the radiation absorber.

* * * * *